(12) United States Patent
Zhu et al.

(10) Patent No.: US 11,357,091 B1
(45) Date of Patent: Jun. 7, 2022

(54) TIMER CONTROL CIRCUIT

(71) Applicant: Ningbo EverFlourish Smart Technology Corp., Ltd., Ningbo (CN)

(72) Inventors: Liangxiong Zhu, Ningbo (CN); Langhua Li, Ningbo (CN)

(73) Assignee: Ningbo EverFlourish Smart Technology Corp., Ltd., Ningbo (CN)

( * ) Notice: Subject to any disclaimer, the term of this patent is extended or adjusted under 35 U.S.C. 154(b) by 0 days.

(21) Appl. No.: 17/349,088

(22) Filed: Jun. 16, 2021

(30) Foreign Application Priority Data

Dec. 8, 2020 (CN) .......................... 202011422110.9

(51) Int. Cl.
*H05B 47/16* (2020.01)

(52) U.S. Cl.
CPC .................................... *H05B 47/16* (2020.01)

(58) Field of Classification Search
CPC ......... H05B 47/10; H05B 47/16; H05B 45/10
See application file for complete search history.

(56) References Cited

U.S. PATENT DOCUMENTS

2014/0320020 A1* 10/2014 Shirai .................... H05B 45/10
315/246

\* cited by examiner

*Primary Examiner* — Jimmy T Vu
(74) *Attorney, Agent, or Firm* — Leveque Intellectual Property Law, PC

(57) ABSTRACT

The disclosure belongs to the technical field of timers, and provides a timer control circuit which comprises: a setting module configured to set timing time of a timer and generate a timing signal, a control module connected with the setting module and configured to output a control signal according to the timing signal set by the setting module, and a load switch module connected with the control module and configured to control an operation of the timer according to the control signal output by the control module. The advantages of the present disclosure are: the timing time required by the user may be accurately set by the setting module, in order to better solve the user's demand for timing; the timing time required by the user may be accurately controlled by the control module, so that the timing accuracy of the timer is greatly improved.

6 Claims, 3 Drawing Sheets

US 11,357,091 B1

TIMER CONTROL CIRCUIT

CROSS REFERENCE TO RELATED APPLICATION

This patent application claims the benefit and priority of Chinese Patent Application No. 202011422110.9, filed on Dec. 8, 2020, the disclosure of which is incorporated by reference herein in its entirety as part of the present application.

TECHNICAL FIELD

The disclosure relates to the technical field of timers, in particular to a timer control circuit.

BACKGROUND

Nowadays, in the context of smart home, it is becoming more and more common to control operations of electronic appliances by timers. However, most of the current timers pre-set timing durations by single-chip microcomputers, which makes it very difficult to continuously adjust the timing duration according to demands of a user.

For example, a timer may be based on a single-chip microcomputer, which is provided with a single-chip circuit, a decoder circuit, a key circuit, a display circuit and an alarm circuit. The single-chip circuit is respectively connected with the decoder circuit, the key circuit, the display circuit and the alarm circuit. The decoder circuit is further connected with the display circuit. This timer has a complex circuit structure, and provides a troublesome timing setting.

SUMMARY

The present disclosure advantageously provides a timer control circuit that, inter alia, solves the problem that the timing cannot be set according to an actual requirement. In order to achieve this and other effects, the disclosure provides at least the following advantages.

A timer control circuit, comprising: a setting module configured to set timing time of a timer and generate a timing signal; a control module connected with the setting module and configured to output a control signal according to the timing signal set by the setting module; and a load switch module connected with the control module and configured to control an operation of the timer according to the control signal output by the control module; wherein, the setting module comprises a key K1, a capacitor C6, a key K2, a capacitor C7, a resistor R6 and a light emitting diode LED1; an end of the key K1 is connected with the control module, another end of the key K1 is grounded, the capacitor C6 is connected in parallel with the key K1, an end of the key K2 is connected with the control module, another end of the key K2 is grounded, the capacitor C7 is connected in parallel with the key K2, an anode of the light emitting diode LED1 is connected with an end of the resistor R6, another end of the resistor R6 is connected with the control module, and a cathode of the light emitting diode LED1 is grounded.

Optionally, the control module comprises a control chip IC1, a crystal oscillator circuit and a power supply circuit; wherein, the eleventh pin of the control chip IC1 and the twelfth pin of the control chip IC1 both are connected with the crystal oscillator circuit, the ninth pin of the control chip IC1 and the tenth pin of the control chip IC1 both are connected with the power supply circuit, the first pin of the control chip is connected with the another end of the resistor R6 in the setting module, the fourth pin of the control chip is connected with the end of the key K1 in the setting module, and the sixteenth pin of the control chip is connected with the end of the key K2 in the setting module.

Optionally, the crystal oscillator circuit comprises a crystal oscillator Y1; wherein the first terminal of the crystal oscillator Y1 is connected with the eleventh pin of the control chip IC1, the third terminal of the crystal oscillator Y1 is connected with the twelfth pin of the control chip IC1, and the second terminal of the crystal oscillator Y1 is grounded.

Optionally, the power supply circuit comprises a diode D5, a resistor R5, a capacitor C3 and a capacitor C4; wherein, an anode of the diode D5 is connected with the ninth pin of the control chip IC1, a cathode of the diode D5 is connected with the tenth pin of the control chip IC1, the resistor R5 is connected in parallel with the diode D5, the anode of the diode D5 is further connected with an end of the capacitor C3, another end of the capacitor C3 is grounded, an end of the capacitor C4 is connected with the tenth pin of the control chip IC1, another end of the capacitor C4 is grounded, and the tenth pin of the control chip IC1 is further connected with a 5V power supply.

Optionally, the load switch module comprises a load circuit and a switch circuit; wherein, the load circuit comprises a resistor R4, a triac TR1, a diode D3, a triac TR2, a capacitor C1 and a resistor R1; an end of the resistor R4 is connected with the third pin of the control chip IC1, another end of the resistor R4 is connected with the first terminal of the triac TR1, the second terminal of the triac TR1 is connected with an end of the capacitor C1, another end of the capacitor C1 is connected with the switch circuit, the third terminal of the triac TR1 is connected with a cathode of the diode D3, an anode of the diode D3 is connected with the first terminal of the triac TR2, both the second terminal and the third terminal of the triac TR2 are connected with the switch circuit, the anode of the diode D3 is further connected with an end of the resistor R1, and another end of the resistor R1 is connected with the switch circuit.

Optionally, the switch circuit comprises a switch SW1, a resistor R3, a diode D1, a resistor R2, a resistor R7, a capacitor C8, a socket L1 and a socket L2; wherein, the first terminal of the switch SW1 is connected with the socket L2, the second terminal of the switch SW1 is grounded, the third terminal of the switch SW1 is respectively connected with the load circuit and an end of the resistor R7, another end of the resistor R7 is respectively connected with the seventh pin of the control chip IC1 and an end of the capacitor C8, another end of the capacitor C8 is grounded, the end of the resistor R7 connected with the switch SW1 is further connected with an end of the resistor R2, another end of the resistor R2 is connected with the 5V power supply, the another end of the resistor R2 is further connected with a cathode of the diode D1, and an anode of the diode D1 is connected with the socket L1 through the resistor R3.

Compared with the prior art, the present disclosure has at least the following beneficial effects: the timing time required by the user may be accurately set by the setting module, in order to better solve the user's demand for timing, such that when the user's demand for timing changes, a timing setting may be changed by the setting module to satisfy the user's demand; and the timing time required by the user may be accurately controlled by the control module, so that the timing accuracy of the timer is greatly improved.

DETAILED DESCRIPTION

The following are specific embodiments of the present disclosure, and the technical solutions of the present disclosure are further described in conjunction with the accompanying drawings, but the present disclosure is not limited to these embodiments.

Figure 1:
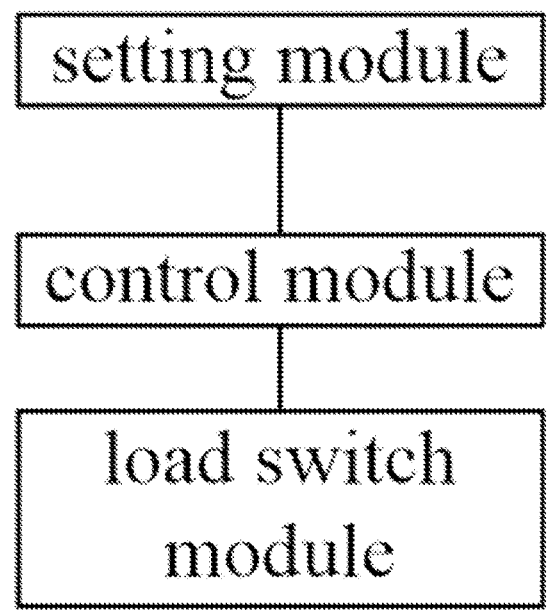
FIG. 1 is a schematic diagram of an architecture according to an embodiment of the present disclosure.

As shown in FIG. 1, the present disclosure provides a timer control circuit, which comprises a setting module, a control module and a load switch module.

Figure 2:
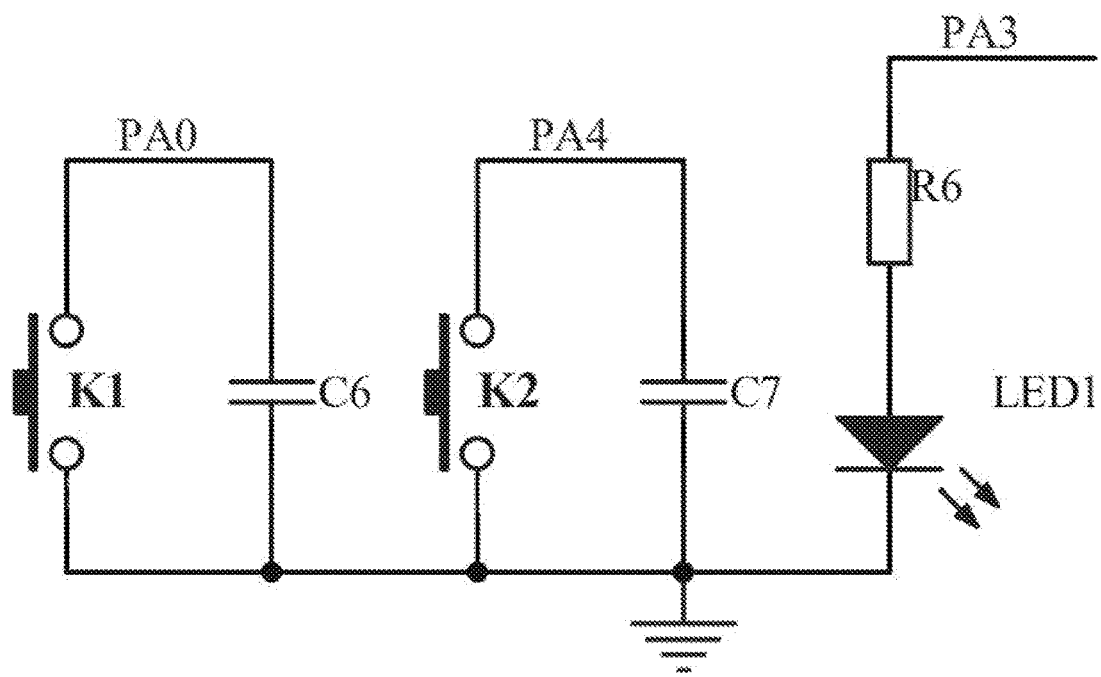
FIG. 2 is a circuit diagram of a setting module according to an embodiment of the present disclosure.

As shown in FIG. 2, the setting module comprises a key K1, a capacitor C6, a key K2, a capacitor C7, a resistor R6 and a light emitting diode LED1.

An end of the key K1 is connected with the control module, another end of the key K1 is grounded, the capacitor C6 is connected in parallel with the key K1, an end of the key K2 is connected with the control module, another end of the key K2 is grounded, the capacitor C7 is connected in parallel with the key K2, an anode of the light emitting diode LED1 is connected with an end of the resistor R6, a cathode of the light emitting diode LED1 is grounded, and another end of the resistor R6 is connected with the control module.

The key K1 is pressed once (that is, a dial of the timer is rotated one mark, wherein, one mark represents half an hour), and then the dial of the timer is pressed once (i.e. the key K2 is pressed once), to generate a signal as a setting signal of a single-chip microcomputer. For example, assuming that actual current time is 3:20 PM, the dial is rotated to the closest time 3:30 PM as the current time, and then the key K2 is pressed to determine the current time as a start, to set a switching time of the timer. If the timer is expected to turn on from 5 to 8 o'clock, the dial is turned to 5 o'clock (that is, the key K1 is pressed 3 times, such that the time will pass 1.5 hours) and then the dial (the key K2) is pressed to make the timer turn on at 5 o'clock (an indicator lamp is illuminated), after that, the dial is turned to 8 o'clock, and the dial (the key K2) is pressed (the indicator lamp is extinguished). A time period can be set multiple times.

The setting module is configured to set timing time of the timer and generate a timing signal. The timing time required by a user may be accurately set by the setting module to better solve the user's demand for timing.

Figure 3:
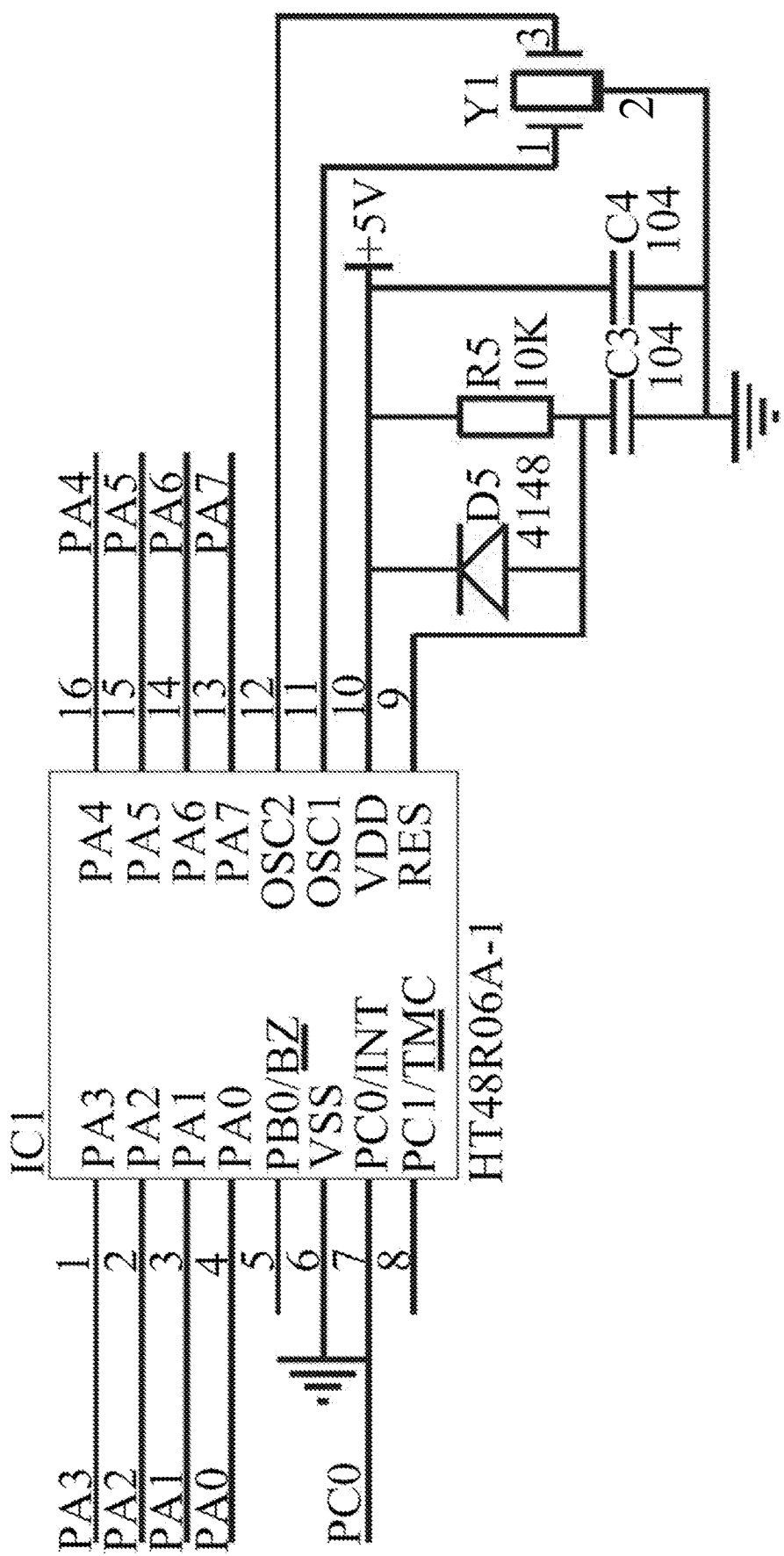
FIG. 3 is a circuit diagram of a control module according to an embodiment of the present disclosure.

Optionally, as shown in FIG. 3, the control module is connected with the setting module and is configured to output a control signal according to the timing signal set by the setting module. The timing time required by the user may be accurately controlled by the control module, so that a timing accuracy of the timer is greatly improved. In certain embodiments, the control module comprises a control chip IC1, a crystal oscillator circuit and a power supply circuit.

The eleventh and twelfth pins of the control chip IC1 both are connected with the crystal oscillator circuit, the ninth and tenth pins of the control chip IC1 both are connected with the power supply circuit, the first pin of the control chip is connected with the another end of the resistor R6 in the setting module, the fourth pin of the control chip is connected with an end of the key K1 in the setting module, and the sixteenth pin of the control chip is connected with the end of the key K2 in the setting module.

The crystal oscillator circuit comprises a crystal oscillator Y1. The first terminal of the crystal oscillator Y1 is connected with the eleventh pin of the control chip IC1, the third terminal of the crystal oscillator Y1 is connected with the twelfth pin of the control chip IC1, and the second terminal of the crystal oscillator Y1 is grounded.

The power supply circuit comprises a diode D5, a resistor R5, a capacitor C3 and a capacitor C4. An anode of the diode D5 is connected with the ninth pin of the control chip IC1, a cathode of the diode D5 is connected with the tenth pin of the control chip IC1, the resistor R5 is connected in parallel with the diode D5, the anode of the diode D5 is further connected with an end of the capacitor C3, another end of the capacitor C3 is grounded, an end of the capacitor C4 is connected with the tenth pin of the control chip IC1, another end of the capacitor C4 is grounded, and the tenth pin of the control chip IC1 is further connected with a 5V power supply.

Figure 4:
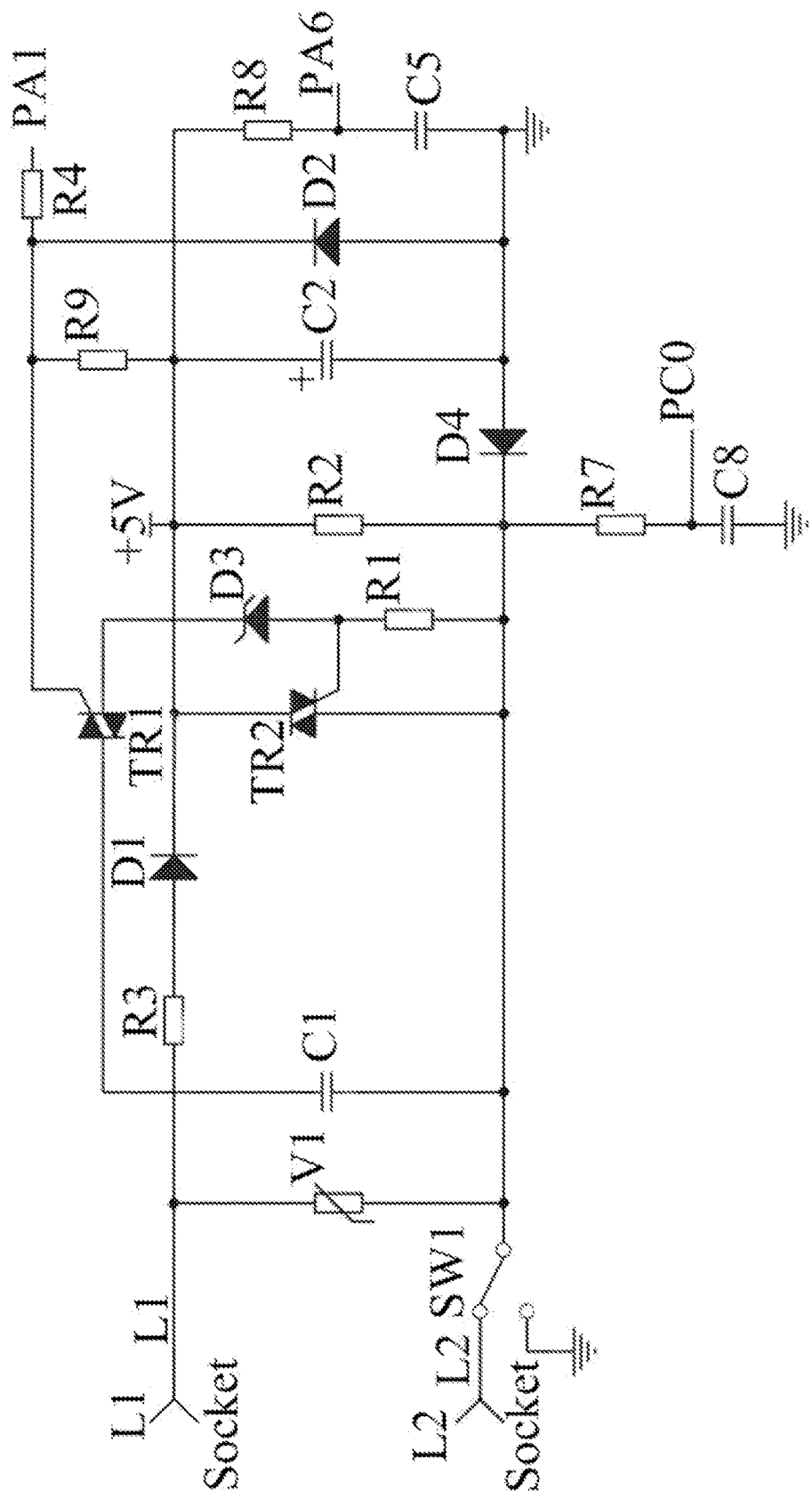
FIG. 4 is a circuit diagram of a load switch module according to an embodiment of the present disclosure.

Furthermore, as shown in FIG. 4, the load switch module is connected with the control module and is configured to control an operation of the load according to the control signal output by the control module. In certain embodiments, the load switch module comprises a load circuit and a switch circuit.

The load circuit comprises a resistor R4, a triac TR1, a diode D3, a triac TR2, a capacitor C1 and a resistor R1. An end of the resistor R4 is connected with the third pin of the control chip IC1, another end of the resistor R4 is connected with the first terminal of the triac TR1, the second terminal of the triac TR1 is connected with an end of the capacitor C1, another end of the capacitor C1 is connected with the switch circuit, the third terminal of the triac TR1 is connected with a cathode of the diode D3, an anode of the diode D3 is connected with the first terminal of the triac TR2, both the second and third terminals of the triac TR2 are connected with the switch circuit, the anode of the diode D3 is further connected with an end of the resistor R1, and another end of the resistor R1 is connected with the switch circuit.

The load circuit further comprises a resistor R9, a capacitor C2, a diode D4, a diode D2, a resistor R8 and a capacitor C5.

An end of the resistor R9 is connected with the first terminal of the triac TR1, another end of the resistor R9 is respectively connected with an anode of the capacitor C2 and the 5V power supply, a cathode of the capacitor C2 is connected with an anode of the diode D4, a cathode of the diode D4 is connected with a third terminal of the switch SW1, a cathode of the diode D2 is connected with the first terminal of the triac TR1, an anode of the diode D2 is connected with the anode of the diode D4, an end of the resistor R8 is connected with the 5V power supply, another end of the resistor R8 is respectively connected with the fourth pin of the control chip IC1 and an end of the capacitor C5, another end of the capacitor C5 is connected with the anode of the diode D4, and the anode of the diode D4 is further grounded.

The switch circuit comprises the switch SW1, a resistor R3, a diode D1, a resistor R2, a resistor R7, a capacitor C8, a socket L1 and a socket L2.

The first terminal of the switch SW1 is connected with the socket L2, the second terminal of the switch SW1 is grounded, the third terminal of the switch SW1 is respectively connected with the load circuit and an end of the resistor R7, another end of the resistor R7 is respectively connected with the seventh pin of the control chip IC1 and an end of the capacitor C8, another end of the capacitor C8 is grounded, the end of the resistor R7 connected with the switch SW1 is further connected with an end of the resistor R2, another end of the resistor R2 is connected with the 5V power supply, the another end of the resistor R2 is further connected with a cathode of the diode D1, and an anode of the diode D1 is connected with the socket L1 through the resistor R3.

With reference to FIGS. 2 to 4, the operation process of the overall circuit of the present disclosure is as follows: when the switch SW1 is switched to the first terminal, a 120V mains electricity is half-wave rectified by the resistor R3 and the diode D1, and then stabilized by the diode D3 and the resistor R1 to provide a 5V direct current power supply for the control chip IC1 to operate and charge the capacitor C2, so that settings can be kept for about 15 minutes in case of sudden power failure. The terminal PC0 of the control chip IC1 determines whether the SW1 is turned on or off by detecting a voltage at the end of the capacitor C8. The setting is cleared and reset by a processing of the control chip IC1. A main circuit TR2 (BTA24) is the load circuit. A terminal PA1 of the IC1 controls a conduction of the triac TR1, so as to control a conduction of the triac TR2, so that the socket L1 and the socket L2 can be electrified, thereby implementing a timing control of an electric appliance.

The specific embodiments described herein are merely examples to illustrate the spirit of the present disclosure. Those skilled in the art to which the present disclosure belongs may make various modifications or supplements to the specific embodiments described or adopt similar alternatives, but they will not depart from the spirit of the present disclosure or go beyond the scope defined in the appended claims.

What is claimed is:

1. A timer control circuit, comprising:
a setting module configured to set timing time of a timer and generate a timing signal;
a control module connected with the setting module and configured to output a control signal according to the timing signal set by the setting module; and
a load switch module connected with the control module and configured to control an operation of the timer according to the control signal output by the control module,
wherein the setting module comprises a first key, a first capacitor, a second key, a second capacitor, a first resistor and a light emitting diode, and
wherein an end of the first key is connected with the control module, another end of the first key is grounded, the first capacitor is connected in parallel with the first key, an end of the second key is connected with the control module, another end of the second key is grounded, the second capacitor is connected in parallel with the second key, an anode of the light emitting diode is connected with an end of the first resistor, another end of the first resistor is connected with the control module, and a cathode of the light emitting diode is grounded.

2. The timer control circuit according to claim 1, wherein:
the control module comprises a control chip, a crystal oscillator circuit and a power supply circuit; and
an eleventh pin of the control chip and a twelfth pin of the control chip both are connected with the crystal oscillator circuit, a ninth pin of the control chip and a tenth pin of the control chip both are connected with the power supply circuit, a first pin of the control chip is connected with the another end of the first resistor in the setting module, a fourth pin of the control chip is connected with the end of the first key in the setting module, and a sixteenth pin of the control chip is connected with the end of the second key in the setting module.

3. The timer control circuit according to claim 2, wherein:
the crystal oscillator circuit comprises a crystal oscillator; and
a first terminal of the crystal oscillator is connected with the eleventh pin of the control chip, a third terminal of the crystal oscillator is connected with the twelfth pin of the control chip, and a second terminal of the crystal oscillator is grounded.

4. The timer control circuit according to claim 2, wherein:
the power supply circuit comprises a first diode, a second resistor, a third capacitor and a fourth capacitor; and
an anode of the first diode is connected with the ninth pin of the control chip, a cathode of the first diode is connected with the tenth pin of the control chip, the second resistor is connected in parallel with the first diode, the anode of the first diode is further connected with an end of the third capacitor, another end of the third capacitor is grounded, an end of the fourth capacitor is connected with the tenth pin of the control chip, another end of the fourth capacitor is grounded, and the tenth pin of the control chip is further connected with a 5V power supply.

5. The timer control circuit according to claim 2, wherein:
the load switch module comprises a load circuit and a switch circuit;
the load circuit comprises a third resistor, a first triac, a second diode, a second triac, a fifth capacitor and a fourth resistor; and
an end of the third resistor is connected with a third pin of the control chip, another end of the third resistor is connected with a first terminal of the first triac, a second terminal of the first triac is connected with an end of the fifth capacitor, another end of the fifth capacitor is connected with the switch circuit, a third terminal of the first triac is connected with a cathode of the second diode, an anode of the second diode is connected with a first terminal of the second triac, both a second terminal and a third terminal of the second triac are connected with the switch circuit, the anode of the second diode is further connected with an end of the fourth resistor, and another end of the fourth resistor is connected with the switch circuit.

6. The timer control circuit according to claim 5, wherein:
the switch circuit comprises a switch, a fifth resistor, a third diode, a sixth resistor, a seventh resistor, a sixth capacitor, a first socket and a second socket; and
a first terminal of the switch is connected with the second socket, a second terminal of the switch is grounded, a third terminal of the switch is respectively connected with the load circuit and an end of the seventh resistor, another end of the seventh resistor is respectively connected with a seventh pin of the control chip and an end of the sixth capacitor, another end of the sixth capacitor is grounded, the end of the seventh resistor connected with the switch is further connected with an end of the sixth resistor, another end of the sixth resistor is connected with a 5V power supply, the another end of the sixth resistor is further connected with a cathode of the third diode, and an anode of the third diode is connected with the first socket through the fifth resistor.

* * * * *